United States Patent [19]
Watanabe

[11] Patent Number: 5,590,280
[45] Date of Patent: Dec. 31, 1996

[54] METHOD AND AN APPARATUS FOR RESETTING AN INFORMATION RECORDING APPARATUS

[75] Inventor: Hiroshi Watanabe, Kawasaki, Japan

[73] Assignee: Kabushiki Kaisha Toshiba, Kawasaki, Japan

[21] Appl. No.: 306,950

[22] Filed: Sep. 16, 1994

[30] Foreign Application Priority Data

Sep. 24, 1993 [JP] Japan .................................. 5-237731

[51] Int. Cl.⁶ .................................................. G06F 11/00
[52] U.S. Cl. ..................................... 395/185.08; 371/62
[58] Field of Search ......................... 371/62; 395/185.08, 395/185.01

[56] References Cited

U.S. PATENT DOCUMENTS

| | | | |
|---|---|---|---|
| 4,496,002 | 9/1987 | Schleupen et al. | 371/12 |
| 4,627,060 | 12/1986 | Huang et al. | 371/62 |
| 4,775,957 | 10/1988 | Yakuwa et al. | 364/900 |
| 4,796,211 | 1/1989 | Yokouchi et al. | 364/569 |
| 4,982,404 | 1/1991 | Hartman | 371/62 |
| 5,390,324 | 2/1995 | Burckhartt et al. | 395/575 |

FOREIGN PATENT DOCUMENTS

1901225  9/1978  Germany ....................... H03K 13/32

*Primary Examiner*—Robert W. Beausoliel, Jr.
*Assistant Examiner*—Norman M. Wright
*Attorney, Agent, or Firm*—Cushman, Darby & Cushman IP Group of Pilsbury Madison & Sutro LLP

[57] ABSTRACT

An optical disk drive connected to a host computer system via a small computer system interface has a reset signal detecting circuit for detecting a reset signal output from the host computer system and activating a reset signal continuation counter. The reset signal detecting circuit determines that the reset signal outputs in reply to a true reset request, only when the reset signal continues for a period of time longer than a predetermined time set in the counter. As a result, an unexpected reset operation due to noise or malfunction is prohibited and loss of data is prevented.

16 Claims, 5 Drawing Sheets

METHOD AND AN APPARATUS FOR RESETTING AN INFORMATION RECORDING APPARATUS

BACKGROUND OF THE INVENTION

1. Field of the Invention

The present invention relates to a method and an apparatus for resetting a peripheral device connected to a computer system, such as an optical disk drive, and more particularly to a method and an apparatus, in which a reset signal output from a host computer system is reliably discriminated from the other noise signals.

2. Description of the Related Art

A peripheral device, for example, an optical disk drive serving an external memory device, is connected to a host computer system by a Small Computer System Interface, herein after denotes SCSI.

In general, the optical disk drive includes an interface section that is connected to the host computer system via the SCSI. The interface section receives various signals from the host computer system. It outputs control signals for controlling movable mechanisms in the disk drive and for updating or maintaining the contents of a temporary storage section based on signals supplied from the host computer system. The optical disk drive further includes a driving mechanism control section for controlling the movable mechanisms driven in order to record/read data in/from an optical disk member in accordance with the control signals output from the interface section.

This type of memory device, i.e., the optical disk drive, has a reset function for clearing data which is being input thereto or data which is being to be stored in the optical disk based on a cleaning operation of mechanical controller.

When a reset signal is input to the optical disk drive from the host system via the SCSI, the reset function is enabled and to interrupt the other processes which have been previously input.

According to SCSI protocol, the reset signal becomes "true" (when the reset signal is presented), when the optical disk drive detects that a reset signal is input. The reset function is enabled in response to such detection. Therefore, the optical disk drive may be unexpectedly reset by noise which may occur when signals in a bus line under the SCSI are switched. The consequence is that data may be stored lost.

SUMMARY OF THE INVENTION

An object of the present invention is to provide an optical disk drive which can be driven stably.

Another object of the present invention is to provide an optical disk drive which cannot be reset unexpectedly.

Still another object of the present invention is to provide a reset method, by which the optical disk drive is not unexpectedly reset and by which "true" or "false" reset signal may be discriminated.

According to an aspect of the present invention, there is provided a signal processing apparatus, connected to an external device, for detecting a predetermined signal output from the external device and processing the predetermined signal, the signal processing apparatus comprising:

detecting means for detecting whether the predetermined signal is generated;

determining means for determining whether a predetermined period of time has elapsed since the predetermined signal was generated, in response to a detection result in the detecting means;

checking means for checking whether the predetermined signal is output from the external device, in response to a determination result in the determining means, after the predetermined period of time has elapsed; and controlling means for executing a signal process corresponding to the predetermined signal, when the checking means checks that the predetermined signal is output from the external device, after the predetermined period of time has elapsed.

According to another aspect of the present invention, there is provided a method for resetting an information recording apparatus, using a small computer interface system, comprising the steps of:

detecting a reset signal;

counting a period of time in which the detected reset signal has continued;

comparing the period of time in which the detected reset signal has continued with a predetermined buffer time;

initiating a reset mode task, when the period of time in which the detected reset signal has continued is longer than the buffer time; and outputting a reset enable signal.

According to still another aspect of the present invention, there is provided a method for resetting an information recording apparatus, using a small computer interface system, comprising the steps of:

detecting a reset signal;

counting a period of time in which the detected reset signal has continued;

comparing the period of time in which the detected reset signal has continued with a predetermined buffer time;

checking whether the reset signal is output;

initiating a reset mode task, when the period of time in which the detected reset signal has continued is longer than the buffer time; and outputting a reset enable signal.

According to further another aspect of the present invention, there is provided a signal processing apparatus, connected to an external device, for detecting a predetermined signal output from the external device and performing a reset process corresponding to the predetermined signal, the signal processing apparatus comprising:

first detecting means for detecting whether the predetermined signal is generated;

first checking means for checking whether the predetermined signal output from the external device is true or false in response to a detection result in the first detecting means;

determining means for determining whether a predetermined period of time has elapsed since the predetermined signal was generated, in response to a detection result in the first detecting means;

second checking means for checking whether the predetermined signal output from the external device is true or false, in response to a determination result in the determining means, after the predetermined period of time has elapsed; and executing means for executing a predetermined process corresponding to the predetermined signal, when the first checking means checks that the predetermined signal is true and the second checking means checks that the predetermined signal output from the external device is true after the predetermined period of time has elapsed;

second detecting means for detecting whether generation of the predetermined signal from the external device is ceased;

third checking means for checking whether generation of the predetermined signal from the external device is ceased in response to a detection result of the second detecting means; and means for terminating the predetermined process executed by the executing means, in response to a check result of the third checking means.

According to still further another aspect of the present invention, there is provided a signal processing apparatus, connected to an external device, for detecting a reset signal output from the external device and performing a reset process corresponding to the reset signal, the signal processing apparatus comprising:

first detecting means for detecting whether the reset signal is generated;

first checking means for checking whether the reset signal output from the external device is true or false in response to a detection result in the first detecting means;

determining means for determining whether a predetermined period of time has elapsed since the reset signal was generated, in response to a detection result in the first detecting means;

second checking means for checking whether the reset signal output from the external device is true or false, in response to a determination result in the determining means, after the predetermined period of time has elapsed; and executing means for executing a reset process corresponding to the reset signal, when the first checking means checks that the reset signal is true and the second checking means checks that the reset signal output from the external device is true after the predetermined period of time has elapsed;

second detecting means for detecting whether generation of the reset signal from the external device is ceased;

third checking means for checking whether generation of the reset signal from the external device is ceased in response to a detection result of the second detecting means; and means for terminating the reset process executed by the executing means, in response to a check result of the third checking means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described with reference to the accompanying drawings.

Figure 1:
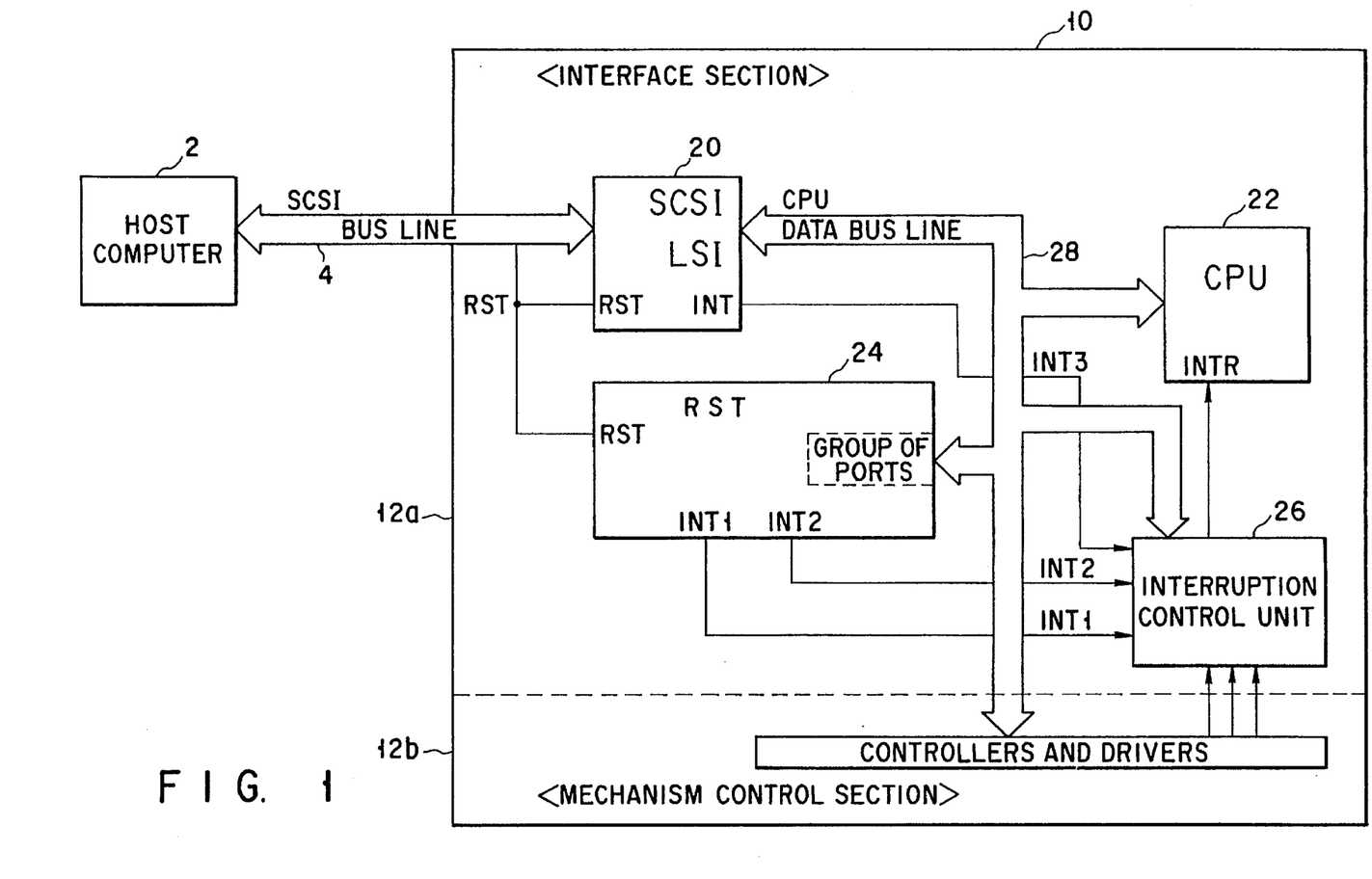
FIG. 1 is a schematic diagram showing an optical disk drive unit incorporating a reset detection circuit according to an embodiment of the present invention.

As shown in FIG. 1, an optical disk drive unit 10 is connected to a host computer 2 via a Small Computer System Interface bus line, hereinafter referred to as a SCSI bus line 4.

The optical disk drive unit 10 includes an interface section 12a for receiving an instruction from the host computer 2 and providing a predetermined control signal on the basis of the received instruction, and a driving mechanism control section 12b for moving various movable mechanisms (not shown) in the optical disk drive unit 10 under control of the interface section 12a.

The interface section 12a includes a Small Computer System Interface LSI after calls SCSI LSI 20 for transmitting/receiving a signal to/from the host computer 2 based on the SCSI protocol, a CPU (main control unit) 22 for controlling the disk drive unit 10, a reset detection circuit 24 for discriminating whether a reset signal for resetting the disk drive unit 10 is true or false, and an interruption control unit 26 for controlling various interruption signals supplied to the disk drive unit 10. The SCSI LSI 20, the CPU 22, the reset detection circuit 24 and the interruption control unit 26 are connected to one another by a number of signal lines (to which reference numerals are not assigned) in order to transmit/receive a control signal to/from a CPU data bus line 28.

Figure 2:
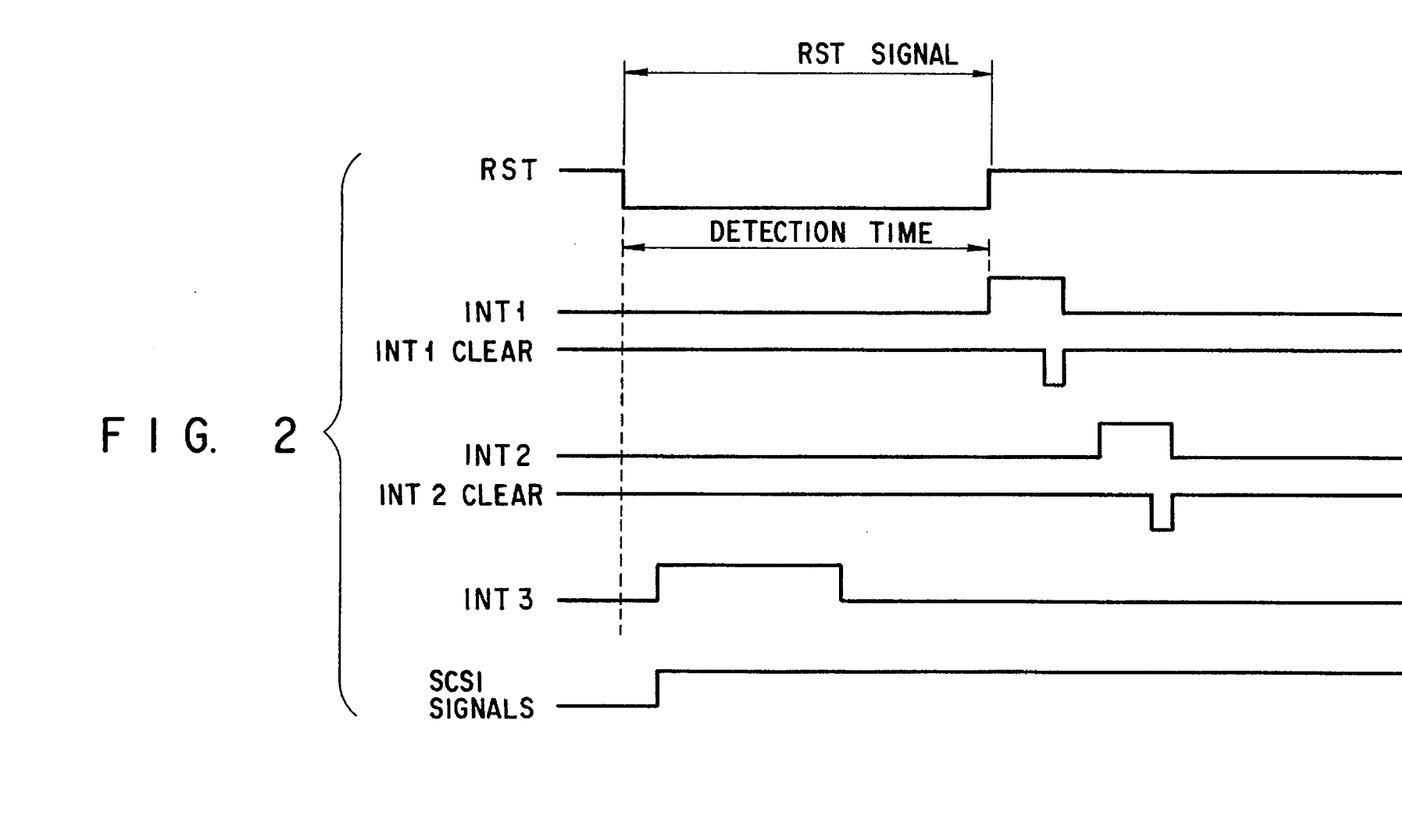
FIG. 2 is a diagram showing components of a reset signal applicable to the reset detection circuit incorporated in the optical disk drive shown in FIG. 1.

As shown in FIG. 2, the SCSI LSI 20 outputs a third interruption signal INT3 to the interruption control unit 26, each time it detects a reset signal RST or a signal other than the reset signal RST.

The reset signal RST has a predetermined time period (time width), e.g., 25 µs, by which an unexpected reset of the optical disk drive unit 10 can be prevented.

The reset detection circuit 24 generates a first interruption signal INT1, after a detection time period preset in accordance with the time width has elapsed. The detection time period is set to about 25 µm (shorten than 25 µm). The signal INT1 is cleared by an INT1 clear signal output from the CPU 22. The reset detection circuit 24 generates a second interruption signal INT2, when the reset signal RST is falsified. The signal INT2 is cleared by an INT2 clear signal output from the CPU 22.

In this manner, the reset signal RST is detected to present only when the signal INT1 is turned on prior to the signal INT2. In this situation it is determined that the reset signal RST is continued for the time width or longer, with the result that the CPU 22 instructs a reset of the optical disk drive unit 10.

Figure 3:
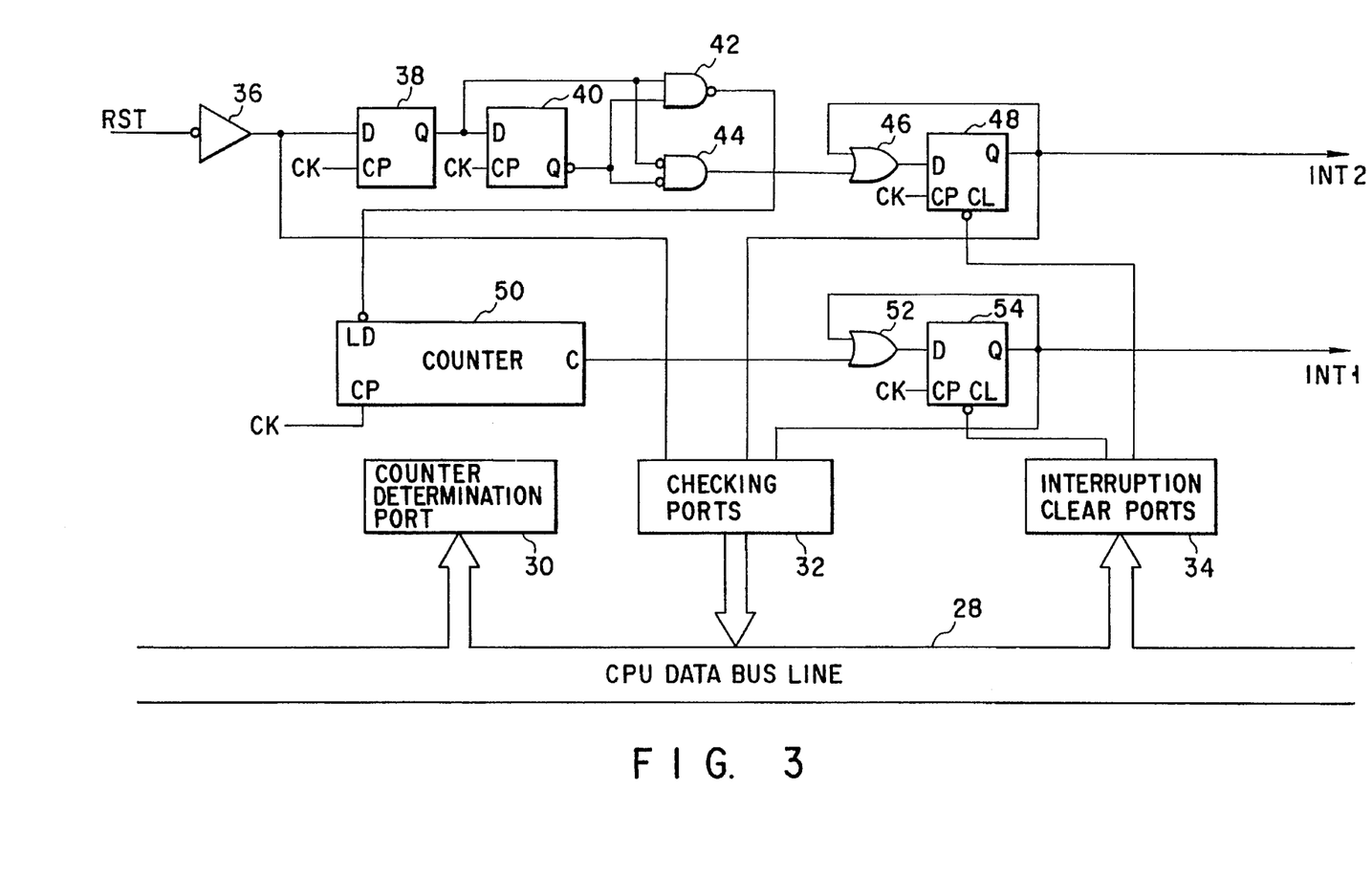
FIG. 3 is a circuit diagram showing an example of reset detection circuit incorporated in the optical disk drive unit shown in FIG. 1.

FIG. 3 shows in detail an example of the reset detection circuit 24.

As shown in FIG. 3, the reset detection circuit 24 includes a detection buffer counter determination port 30 for determining the detection time under control of the CPU 22, a checking port 32 for checking whether the reset signal RST indicates a "true" reset and the signals INT1 and INT2, and an interruption clear port 34 for receiving the INT1 clear signal and the INT2 clear signal supplied from the CPU 22.

The reset signal RST and the interruption signals INT1 and INT2 are input to the checking port 32. The ports 30, 32 and 34 are connected to the CPU 22 via the CPU data bus line 28.

The reset detection circuit 24 has a buffer amplifier 36 for shaping the waveform of an input reset signal RST; a first flip-flop circuit 38 driven by the reset signal RST output from the buffer amplifier 36 and a clock pulse output from a clock circuit (not shown); a second flip-flop circuit 40 driven by an output from the first flip-flop circuit 38 and a clock pulse output from a the clock circuit (not shown); and a NAND gate 42 and a reverse-input AND gate 44 which receive outputs from the first and second flip-flop circuits 38 and 40.

The reset detection circuit 24 further includes an OR gate 46 to which an output from the AND gate 44 is input; a third flip-flop circuit 48 driven by an output from the OR gate 46 and a clock pulse output from the clock circuit (not shown); a counter circuit 50 for raising a carry output (representing that a counted value coincides with a preset counter set value) on the basis of an output from the NAND gate 42 and a clock pulse output from the clock circuit (not shown); an OR gate 52 to which an output from the counter circuit 50 is input; and a fourth flip-flop circuit 54 driven by an output from the OR gate 52 and a clock pulse output from the clock circuit (not shown). The third flip-flop circuit 48 is generating a second interruption signal INT 2 based on the signals the output from the OR gate 46 and the clock pulse. The fourth flip-flop circuit 54 is generating a first interruption signal INT 1 based on the signals the output from the OR gate 52 and the clock pulse. The third and fourth flip-flop circuits 48 and 54 are reset by interruption clear signals each output from the interruption clear port 34.

As is shown in FIG. 3, an output from the buffer amplifier 36 is input to a D terminal (data input terminal) of the first flip-flop circuit 38. An output from the first flip-flop circuit 38 is input to a D terminal (data input terminal) of the second flip-flop circuit 40 and the NAND gate 42.

An output of the second flip-flop circuit 40 is input to the NAND gate 42 and the reverse-input AND gate 44.

An output of the NAND gate 42 is input to the counter circuit 50. The counter circuit 50 outputs the carry output to the OR gate 52, when the output reaches a predetermined count value set by the CPU 22.

The outputs of the OR gates 46 and 52 are input to D terminals (data input terminals) of the third and fourth flip-flop circuits 48 and 54, respectively. The circuits 48 and 54 output interruption signals INT1 and INT2, until they receive the INT1 clear signal and the INT2 clear signal from the interruption clear port 34.

An operation of the reset detection circuit 24 for detecting a reset signal will be described in detail.

Figure 4:
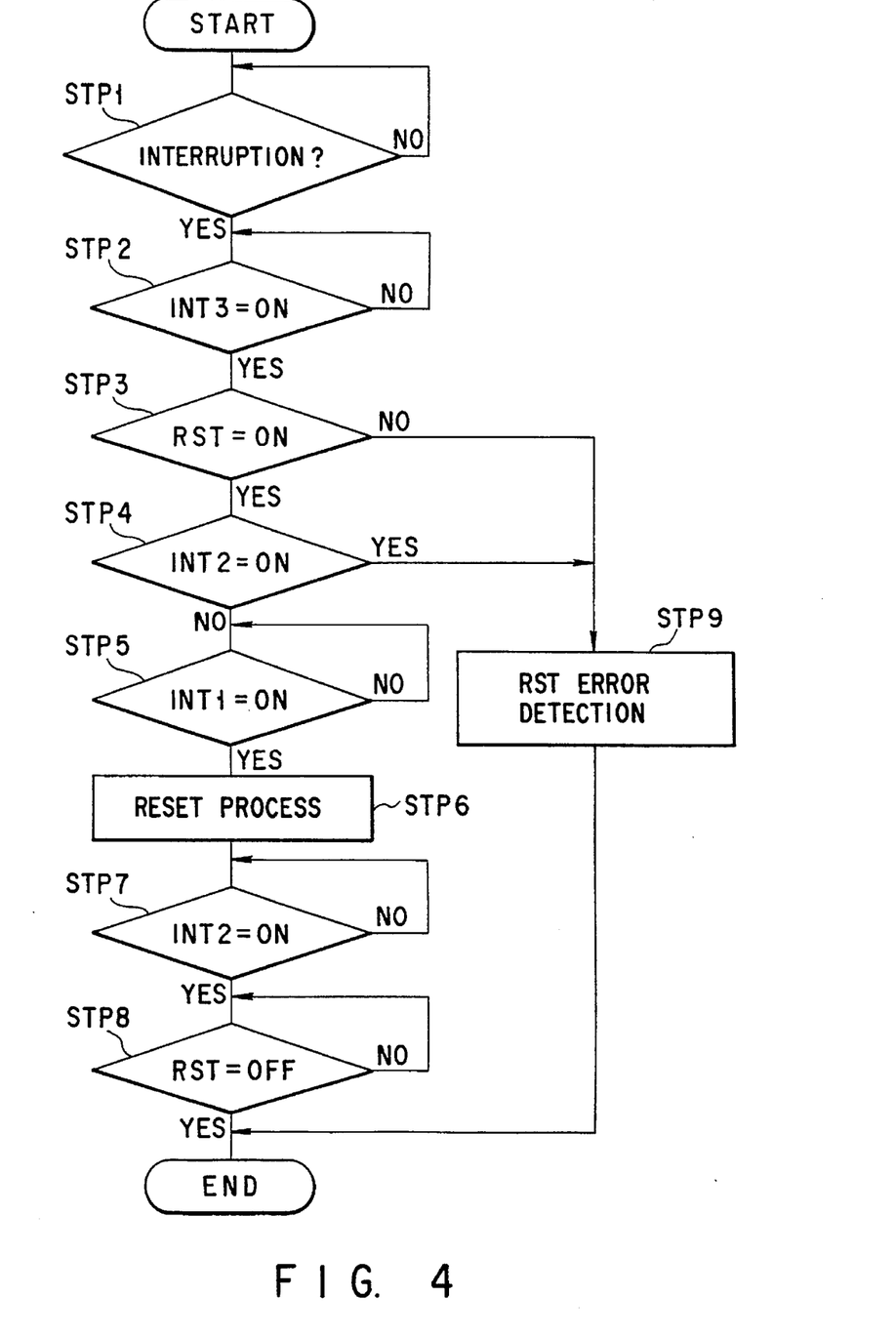
FIG. 4 is a flowchart showing an operation for resetting an optical disk drive unit by means of the reset detection circuit shown in FIG. 3.

Referring to FIG. 4, it is checked whether an interruption signal RST is requested from the interruption control unit 26 (STP1). If a reset signal RST is input to the buffer amplifier 36 (STP1-YES), it is determined whether the input interruption signal is the third interruption signal INT3 (whether INT3 is "present") (STP2).

If the input interruption signal is INT3 (STP2-YES), all of signals to control the drive 10 are released from the SCSI LSI 20, the CPU 22 checks the check port 34 to determine whether the INT 3 is ON. Subsequently, it is determined whether the signal is the signal RST (whether the signal RST is "present") (STP 3).

If the reset signal RST is detected (STP3-YES), it is determined whether the interruption signal INT1 is input in a state where the interruption signal INT2 (for checking an output of the checking port 32) is "OFF" (STP4 and STP5).

If the interruption signal INT1 is input in a state where the interruption signal INT2 is "OFF" (SPT4-NO and STP5-YES), it is determined, by checking the checking port 32, whether the signals INT2 and INT1 are correctly generated. Thereafter, an interruption request signal INTR is output from the interruption control unit 26 to the CPU 22 and the reset signal RST detected by the SCSI LSI 20 is determined by the CPU 22, with the result that the disk drive 10 is reset (STP6).

When the reset process is completed in the step STP6, it is checked whether the interruption signal INT2 is turned on (STP7). Subsequently, it is checked whether the RST signal from the host computer is turned off (STP8).

In contrast, if the input interruption signal (detected in the step STP3) is not the reset signal RST (STP3-NO), it is determined that an instruction for initiating a reset task (reset interruption) is incorrect (STP9).

Further, since the time period of the reset signal RST is shorter than the predetermined time period (the detection time period), if the interruption signal INT2 is input, former the signal INT1, in the step STP 4 (STP4-YES, no input of INT1), it is determined that an instruction for initiating a reset task (reset interruption) is incorrect, as in the step STP9.

Each time the interruption signal INT2 or INT1 is turned on, a change in the output the checking port 3 is checked by the CPU 22, in order to check whether the interruption signal is correct or not.

Figure 5:
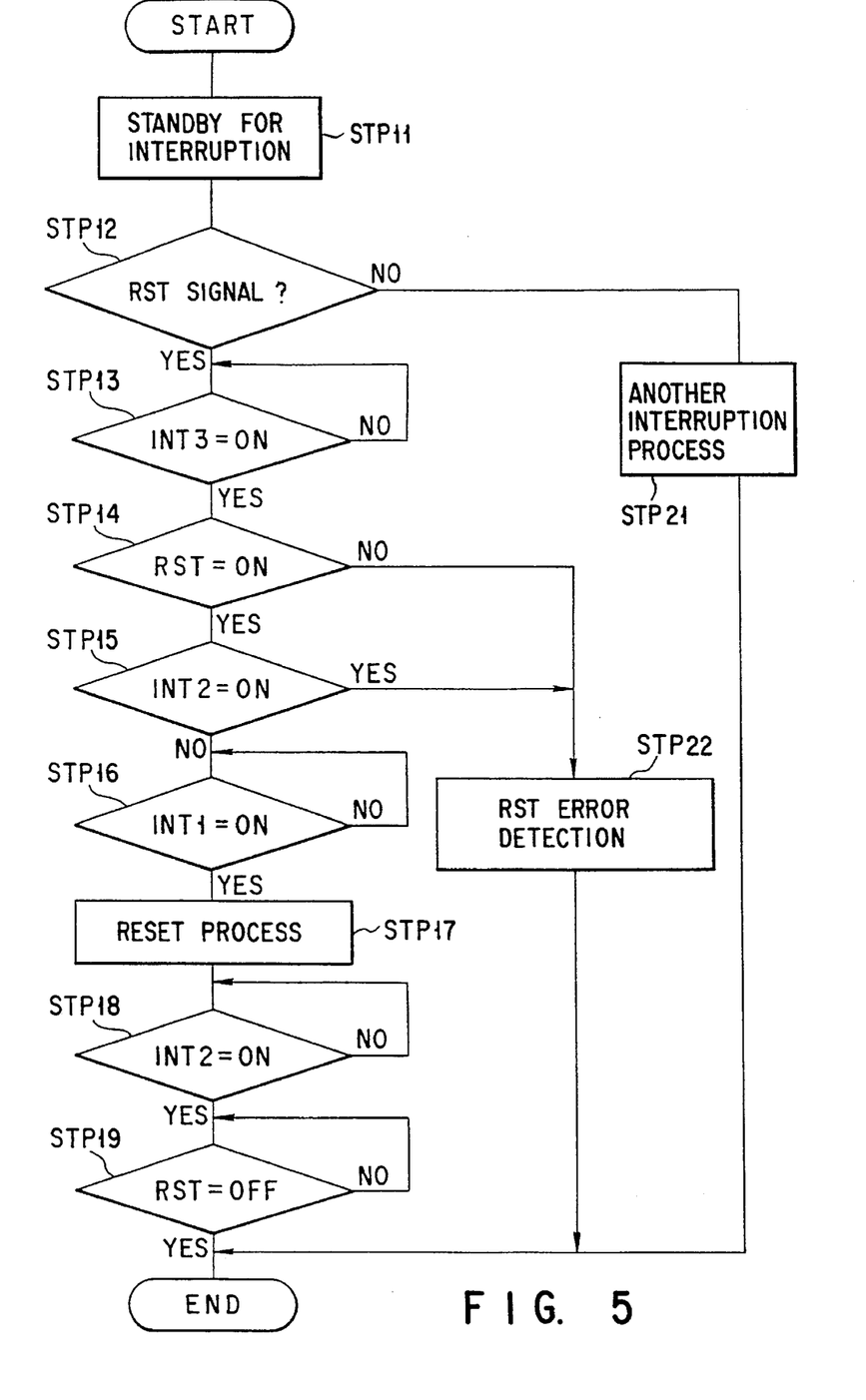
FIG. 5 is a flowchart showing another operation for resetting an optical disk drive unit.

FIG. 5 shows an operation for detecting interruption, other than the operation of the reset detection circuit 24 shown in FIG. 4.

In a standby state, i.e., in a state where an interruption signal is allowed to be input to the buffer amplifier 36 (STP11), it is determined whether an interruption signal input to the buffer amplifier 36 is the reset signal RST (STP12). If the input interruption signal is the reset signal RST (STP12-YES), the CPU 22 checks the check port to determine whether the signal is the third interruption signal INT3 (whether INT3 is ON) (STP13). If it is determined that the input interruption signal is not the reset signal RST (STP12-NO), another interruption process is executed in accordance with a predetermined routine (STP21).

If the input interruption signal is INT3 (SPT13-YES), the CPU 22 checks a reset signal RST port of the check port to determine whether the signal is the reset signal RST (whether the signal RST is ON) (STP14). If the reset signal RST is absence (STP14-NO), it is determined that the reset signal RST is erroneously detected (STP22).

If the reset signal RST is detected in step STP14 (STP14-YES), the CPU 22 checks the check port to determine whether the interruption signal INT2 (for checking a change in the output from the checking port 32) is OFF (STP15).

If the interruption signal INT2 is OFF in the step STP15 (STP15-NO), it is determined whether the interruption signal INT1 is input or not (STP16). If the interruption signal INT2 is ON (STP15-YES), it is determined that the reset signal RST is erroneously detected (STP22).

If it is determined in the step STP 16 that the interruption signal INT1 is ON, an interruption request signal INTR is output from the SCSI LSI 20 to the CPU 22, with the result that the disk drive 10 is reset, i.e., a reset process is executed (STP17).

When the reset process is completed in the step STP17, it is detected, through a check of the check port by means of the CPU 22, whether the interruption signal INT2 is turned on, whether the RST signal from the host computer is turned off (STP18 and STP19) and whether a reset operation is completed (STP19). If completion of a reset operation is not detected in the steps STP18 and STP19, an error in a reset operation is detected and the reset operation is compulsorily terminated.

Thus, even if a signal similar to the reset signal RST is erroneously generated due to a trouble on a circuit of the interface section 12a (hardware), a reset task is prevented from being initiated unexpectedly.

As has been described above, a reset detecting circuit, for detecting whether a reset signal is actually input in response to a reset request by making use of first and second interruption signals, when the reset signal is input, is added to an optical disk drive connected to a host computer via a small computer interface (SCSI protocol). As a result, a reset task is prevented from being initiated due to an incontinous noise.

Moreover, since it is possible to check whether an input reset signal is generated actually on the basis of a reset instruction, the memory device is prevented from an unexpected reset due to an erroneous operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A reset apparatus comprising:

detecting means for generating a detection result corresponding to a predetermined signal received from an external device;

determining means, including counting means, for counting a period of time during which the predetermined signal is continuous based on the detection result, and for generating a reset enable signal when the period of time counted is longer than a predetermined period of time;

checking means for checking whether the predetermined signal is output from the external device, said check being performed in response to the enable signal generated by the determining means; and controlling means for executing a signal process corresponding to the predetermined signal when the checking means checks that the predetermined signal is output from the external device after the predetermined period of time has elapsed.

2. The reset apparatus according to claim 1, wherein the determining means has auxiliary signal generating means for generating an auxiliary signal at a time when the detecting means detects output of the predetermined signal.

3. The reset apparatus according to claim 2, further comprising discriminating signal generating means for generating a predetermined check signal and supplying the predetermined check signal generated to the determining means.

4. The reset apparatus according to claim 3, wherein the determining means outputs the reset enable signal when the discriminating signal generating means supplies the check signal, if the auxiliary signal generating means is generating the auxiliary signal.

5. The reset apparatus according to claim 1, wherein the predetermined signal includes a reset signal.

6. The reset apparatus according to claim 1, wherein the signal process includes a reset operation.

7. A method for resetting an information recording apparatus, using a small computer interface system, comprising the steps of:

detecting a reset signal;

counting a period of time in which the detected reset signal has continued;

comparing the period of time in which the detected reset signal has continued with a predetermined buffer time;

initiating a reset mode task, when the period of time in which the detected reset signal has continued is longer than the buffer time; and outputting a reset enable signal.

8. A method for resetting an information recording apparatus, using a small computer interface system, comprising the steps of:

detecting a reset signal;

counting a period of time in which the detected reset signal has continued;

comparing the period of time in which the detected reset signal has continued with a predetermined buffer time;

checking whether the reset signal is output;

initiating a reset mode task, when the period of time in which the detected reset signal has continued is longer than the buffer time; and outputting a reset enable signal.

9. A signal processing apparatus, connected to an external device, for detecting a predetermined signal output from the external device and performing a reset process corresponding to the predetermined signal, said signal processing apparatus comprising:

first detecting means for detecting whether the predetermined signal is generated;

first checking means for checking whether the predetermined signal output from the external device is true or false in response to a detection result in the first detecting means;

determining means for determining whether a predetermined period of time has elapsed since the predetermined signal was generated, in response to a detection result in the first detecting means;

second checking means for checking whether the predetermined signal output from the external device is true or false, in response to a determination result in the determining means, after the predetermined period of time has elapsed; and executing means for executing a predetermined process corresponding to the predetermined signal, when the first checking means checks that the predetermined signal is true and the second checking means checks that the predetermined signal output from the external device is true after the predetermined period of time has elapsed;

second detecting means for detecting whether generation of the predetermined signal from the external device is ceased;

third checking means for checking whether generation of the predetermined signal from the external device is ceased in response to a detection result of the second detecting means; and means for terminating the predetermined process executed by the executing means, in response to a check result of the third checking means.

10. A signal processing apparatus, connected to an external device, for detecting a reset signal output from the external device and performing a reset process corresponding to the reset signal, said signal processing apparatus comprising:

first detecting means for detecting whether the reset signal is generated;

first checking means for checking whether the reset signal output from the external device is true or false in response to a detection result in the first detecting means;

determining means for determining whether a predetermined period of time has elapsed since the reset signal was generated, in response to a detection result in the first detecting means;

second checking means for checking whether the reset signal output from the external device is true or false, in response to a determination result in the determining means, after the predetermined period of time has elapsed; and executing means for executing a reset process corresponding to the reset signal, when the first checking means checks that the reset signal is true and the second checking means checks that the reset signal output from the external device is true after the predetermined period of time has elapsed;

second detecting means for detecting whether generation of the reset signal from the external device is ceased;

third checking means for checking whether generation of the reset signal from the external device is ceased in response to a detection result of the second detecting means; and means for terminating the reset process executed by the executing means, in response to a check result of the third checking means.

11. A reset apparatus comprising:

a detector generating a detection result corresponding to a predetermined signal received from an external device;

a determining device, including a counter, counting a period of time during which the predetermined signal is continuous based on the detection result, and generating a reset enable signal when the period of time counted is longer than a predetermined period of time; and a controller executing a signal process based on a predetermined signal that is detected by the detector when the enable signal is generated by the determining device.

12. The reset apparatus according to claim 11, wherein the determining device has auxiliary signal generator generating an auxiliary signal at a time when the detector detects output of the predetermined signal.

13. The reset apparatus according to claim 12, further comprising discriminating signal generator generating a predetermined check signal and supplying the predetermine check signal generated to the determining device.

14. The reset apparatus according to claim 13, wherein the determining device outputs the reset enable signal when the discriminating signal generator supplies the check signal, if the auxiliary signal generator is generating the auxiliary signal.

15. The reset apparatus according to claim 11, wherein the predetermined signal includes a reset signal.

16. The reset apparatus according to claim 11, wherein the signal process includes a reset operation.

* * * * *